(12) United States Patent
Grindle

(10) Patent No.: US 8,474,865 B2
(45) Date of Patent: Jul. 2, 2013

(54) CURTAIN AIRBAG ASSEMBLY FOR A MOTOR VEHICLE

(75) Inventor: Barry Grindle, Saffron Walden (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/312,240

(22) Filed: Dec. 6, 2011

(65) Prior Publication Data

US 2012/0139217 A1 Jun. 7, 2012

(30) Foreign Application Priority Data

Dec. 6, 2010 (GB) .................................. 1020635.7

(51) Int. Cl.
*B60R 21/213* (2011.01)

(52) U.S. Cl.
USPC ...................................................... 280/730.2

(58) Field of Classification Search
USPC ...................................................... 280/730.2
See application file for complete search history.

(56) References Cited

U.S. PATENT DOCUMENTS

| | | | |
|---|---|---|---|
| 5,333,899 A | 8/1994 | Witte | |
| 5,921,576 A * | 7/1999 | Sinnhuber .................... | 280/730.2 |
| 6,039,349 A | 3/2000 | Laporte et al. | |
| 6,152,481 A * | 11/2000 | Webber et al. ............... | 280/730.2 |
| 6,328,334 B1 | 12/2001 | Kanuma ...................... | 280/730.2 |
| 6,343,811 B1 * | 2/2002 | Hammer et al. .............. | 280/730.2 |
| 6,805,374 B2 * | 10/2004 | Saderholm et al. .......... | 280/730.2 |
| 6,986,528 B2 * | 1/2006 | Inoue et al. ................. | 280/730.2 |
| 7,350,804 B2 * | 4/2008 | Bakhsh et al. ............... | 280/730.2 |
| 7,367,582 B2 * | 5/2008 | Nishizawa ................... | 280/730.2 |
| 7,390,017 B2 * | 6/2008 | Inoue et al. ................. | 280/730.2 |
| 7,556,286 B2 * | 7/2009 | Powals ......................... | 280/730.2 |
| 7,568,725 B2 * | 8/2009 | Komiyama ................... | 280/730.2 |
| 7,578,518 B2 * | 8/2009 | Ochiai et al. ................ | 280/730.2 |
| 7,618,057 B2 * | 11/2009 | Pinsenschaum et al. .... | 280/730.2 |
| 7,832,760 B2 * | 11/2010 | Mitsuo et al. ............... | 280/730.2 |
| 7,896,387 B2 * | 3/2011 | Ideue .......................... | 280/730.2 |
| 7,905,510 B2 * | 3/2011 | Messner et al. ............. | 280/728.2 |
| 7,918,482 B2 * | 4/2011 | Sugimoto et al. ........... | 280/729 |
| 8,282,126 B2 * | 10/2012 | Wiik et al. ................... | 280/730.2 |
| 2003/0132619 A1 * | 7/2003 | Winarto et al. .............. | 280/730.2 |
| 2003/0234523 A1 * | 12/2003 | Henderson et al. ......... | 280/730.2 |
| 2006/0097492 A1 | 5/2006 | Bakhsh et al. | |
| 2010/0264630 A1 * | 10/2010 | Walston ....................... | 280/730.2 |

FOREIGN PATENT DOCUMENTS

JP 2007245755 A 9/2007

OTHER PUBLICATIONS

Intellectual Property Office, Search Report for the corresponding GB Patent Application No. GB1020635.7 dated Mar. 22, 2011.

* cited by examiner

*Primary Examiner* — Nicole Verley
(74) *Attorney, Agent, or Firm* — Frank A. MacKenzie; Brooks Kushman P.C.

(57) ABSTRACT

A curtain airbag assembly for occupant protection in a motor vehicle includes a forward airbag stored above a forward window for deployment to a position wherein a main body portion overlies a forward window and a rear end portion extending rearward from the main body overlies a post separating the windows, such as a B-post or C-post, and a rear airbag stored above a rear window for deployment to a position wherein a main body portion overlies the rear window and a forward end portion extends rearward from the main body and overlies the post. The forward and rear end portions vertically overlap one another where they overlie the post, and each has an end lip defining a recess in an outer face of the respective airbag, the end lips shaped to engage with the post.

8 Claims, 3 Drawing Sheets

US 8,474,865 B2

CURTAIN AIRBAG ASSEMBLY FOR A MOTOR VEHICLE

CROSS-REFERENCE TO RELATED APPLICATIONS

This application claims foreign priority benefits under 35 U.S.C. §119(a)-(d) to GB 1020635.7, filed Dec. 6, 2010, which is hereby incorporated by reference in its entirety.

TECHNICAL FIELD

This invention relates to curtain airbag assemblies for occupant protection in motor vehicles.

BACKGROUND

It is well known to provide a motor vehicle with a curtain airbag to protect occupants of the motor vehicle from contact with interior components of the motor vehicle during a crash or other accident, and to prevent a body part of an occupant from passing through a window aperture covered by the curtain airbag.

It is further known to provide two airbags arranged in a front-to-rear relationship such that a rear edge of the forward airbag and a forward edge of the rear airbag are connected by one or more tethers.

During most crashes, it is generally desirable to ensure that the two adjacent edges of the airbags remain close together throughout the event. Keeping the adjacent edges of the two airbags close together makes it unlikely that a gap will form between the airbags that may permit a portion of the occupant's body to contact the underlying structure of the motor vehicle, such as a B-post or C-post separating the window openings. Keeping the adjacent edges of the bags together also makes it less likely that any portions of the airbags will be forced through a window opening during a crash.

SUMMARY

According to a disclosed embodiment, a curtain airbag assembly for a motor vehicle comprises a forward airbag having a main body portion and a rear end portion extending rearward from the main body portion, and a rear airbag having a main body portion and a forward end portion extending forward from the main body portion. The rear end portion and the forward end portion vertically overlap with one another. The forward and rear end portions each have an end lip defining a recess in an outer face of the respective airbag, the end lips shaped to engage with a structural member of the vehicle that the end portions overlie in their zone of vertical overlap.

According to another disclosed embodiment, a motor vehicle comprises a post separating a forward window opening and a rear window opening, and an airbag assembly that includes a forward airbag and a rear airbag. The forward airbag is stored in an uninflated condition above the forward window for deployment downward to an inflated condition wherein a main body portion overlies at least a portion of the forward window and a rear end portion extends rearward from the main body portion and overlies the post. The rear airbag stored is in an uninflated condition above the rear window for deployment downward to an inflated condition wherein a main body portion overlies at least a portion of the rear window and a forward end portion extends rearward from the main body portion and overlies the post. The forward end portion and the rear end portion vertically overlap one another at the locations where they overlie the post.

According to another disclosed embodiment, the forward and rear end portions each have an end lip defining a recess in an outer face of the respective airbag, the recesses shaped to engage with the post.

According to another disclosed embodiment, the motor vehicle further comprises a second post separating the rear window opening from a third window opening rearward of the rear window opening, and a third airbag is stored in an uninflated condition above the third window. The third airbag deploys downward to an inflated condition wherein a main body portion overlies at least a portion of the third window and a forward end portion extends forward from the main body portion and overlies the second post. The rear airbag further has a rear end portion extending rearward from the main body portion to overlie the second post, such that the forward end portion of the third airbag vertically overlaps with the rear end portion of the rear airbag at the second post.

BRIEF DESCRIPTION OF THE DRAWINGS

The invention will now be described by way of example with reference to the accompanying drawing of which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With particular reference to FIGS. 1 to 4 there is shown a motor vehicle 5 having a body structure 6 including a side wall 6W. The side wall 6W defines four window apertures 7A, 7B, 7C and 7D. The first window aperture 7A is separated from the second window aperture 7B by a first generally vertical structural member in the form of a B-post 8B, the second window aperture 7B is separated from the third window aperture 7C by a second vertically extending structural member in the form of a C-post 8C, and the third window aperture 7C is separated from the fourth window aperture 7D by a third vertically extending structural member in the form of a D-post. It will be appreciated that the body structure 6 also includes an A-post (not shown) located forwardly of the B-post 8B and an E-post (not shown) located to the rear of the D-post 8D. The term "generally vertical," as used herein, describes a structural member extending between a roof and/or other portion of the motor vehicle above (and/or defining the upper edge of) a window opening and a portion of the motor vehicle below (and/or defining the lower edge of) a window opening.

Figure 1:
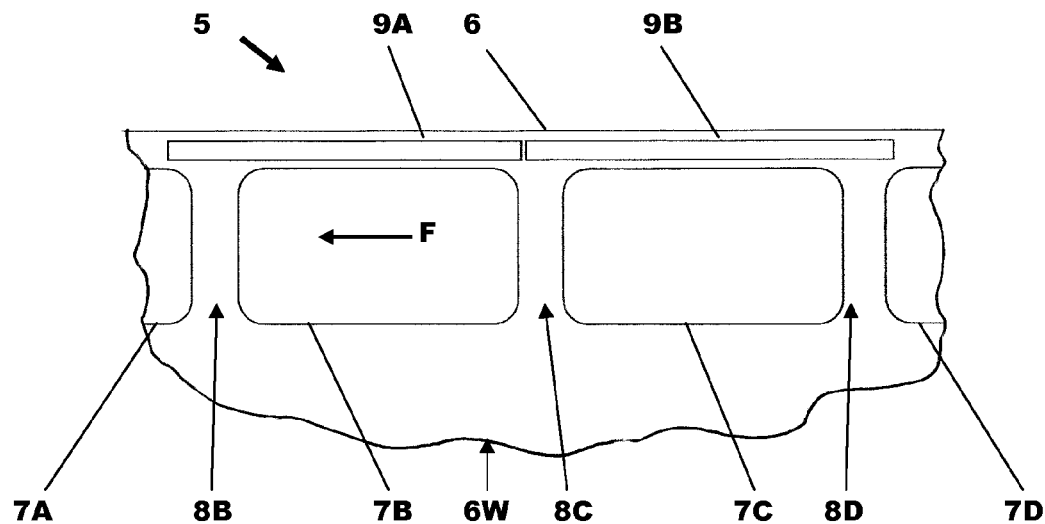
FIG. 1 is a partial interior side view of a right hand side of a motor vehicle having a curtain airbag assembly showing two airbags in a stowed state before deployment.

The front of the motor vehicle 5 is indicated by the arrow F on FIG. 1

Two storage compartments 9A and 9B are formed as part of or attached to the body structure 6 to house two airbags 20, 30 in their uninflated conditions prior to deployment, as is well known in the art.

The airbag assembly comprises four airbags 10, 20, 30 and 40 arranged in a front-to-rear relationship along the length of motor vehicle 5. A first airbag 10 has a front edge adjacent to or overlying the A-post of the motor vehicle 5 and a rear end portion overlying the B-post 8B of the motor vehicle 5; a second airbag 20 has a front end portion overlying the B-post 8B and a rear end portion overlying the C-post 8C of the motor vehicle 5; a third airbag 30 has a front end portion overlying the C-post 8C and a rear end portion overlying the D-post 8D of the motor vehicle 5; and a fourth airbag 40 has a front end portion overlying the D-post 8D and a rear edge adjacent to or overlying the E-post of the motor vehicle 5.

The front end portion of each adjacent airbag complements the rear end portion of the respective adjacent airbag so that a part of both end portions can overlie a respective common structural member 8B, 8C, 8D.

Each of the end portions of the airbags 10, 20, 30 and 40 includes a tongue 11, 22, 23, 32, 33, 43 extending forwardly or rearwardly away from a main body of the respective airbag 10, 20, 30, 40 so as to overlie the respective structural member 8B, 8C and 8D. Each of the tongues 11, 22, 23, 32, 33, 43 may extend past the respective structural member to overlie a portion of the adjacent window aperture 7A, 7B, 7C and 7D. The tongues comprising each pair 11, 23; 22, 33; and 32, 43 overlap one another vertically.

Figure 2:
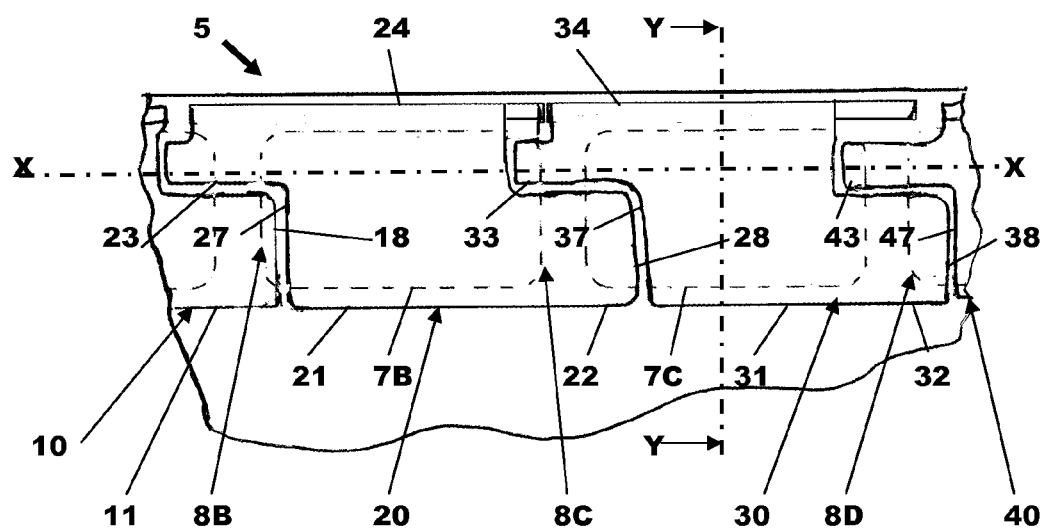
FIG. 2 is a view similar to that of FIG. 1 but showing the two airbags in a deployed state.
Figure 3:
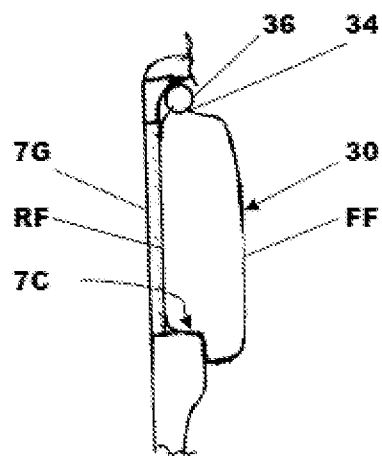
FIG. 3 is a cross-section along the line Y-Y on FIG. 2.
Figure 4:
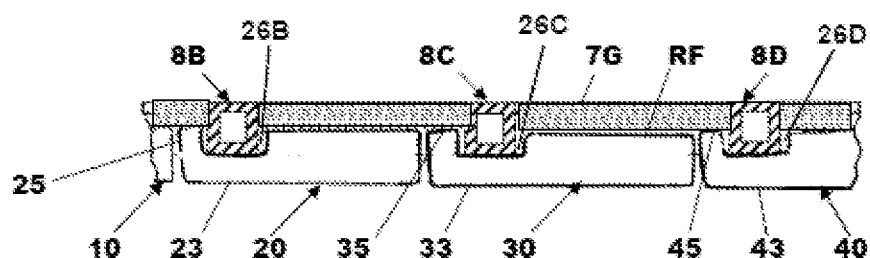
FIG. 4 is a cross-section along the line X-X on FIG. 2.

Although in FIGS. 2 and 4 a gap is shown between adjacent airbags, this is purely for illustrative purposes and in practice adjacent airbags 10, 20; 20, 30 and 30, 40 may abut against one another.

The first airbag 10 has an L-shaped rear end portion formed by a rear end wall 18 and the lower tongue 11 extending rearward past the rear end wall. Although not shown in the figures, an outer face of the tongue 11 is shaped so as to be engageable, when the airbag 10 is deployed, with the B-post 8B. A front portion (not shown) of the first airbag 10 may be shaped for cooperation with the A-post.

The second airbag 20 has an inverted L-shaped front end portion formed by a front end wall 27 and the upper tongue 23 extending forward past the front end wall. Second airbag 20 further has an L-shaped rear end portion formed by a rear end wall 28 and the lower tongue 22 extending rearward past the rear end wall. An outer face (facing outward from the vehicle cabin to face the side wall 6W) of the tongue 23 includes an end lip 25 defining a recess 26B shaped and located to engage, when the airbag 20 is deployed, with the B-post 8B. An outer face of the tongue 22 includes an end lip (not shown) defining a recess shaped and located to engage, when the airbag 20 is deployed, with the C-post 8C. This engagement of the airbag 20 with the B and C posts 8B and 8C prevents sliding of the airbag 20 in a longitudinal direction of the motor vehicle 5.

As the second airbag 20 has an inverted L-shaped front end portion and an L-shaped rear end portion, the configuration of second airbag as a whole may be said to be "Z-shaped," as is apparent from FIG. 2.

The tongue 11 on the first airbag 10 is located near to a lower edge of the airbag 10 and the tongue 23 on the second airbag 20 is located near to an upper edge 24 of the second airbag 20 so that the two tongues 11, 23 can nest or interlock with one another, in an over-under relationship.

It will be appreciated that when the first and second airbags 10 and 20 are in their fully deployed states a friction force is generated between the two tongues 11, 23 particularly along a horizontal interface formed between the two tongues 11, 23. This friction force is advantageous in that it resists sliding of one tongue 11 relative to the other 23 thereby holding the two airbags 10, 20 together.

The third airbag 30 has a inner face FF facing into a passenger compartment of the motor vehicle 5 when the airbag 30 is deployed, an outer face RF facing towards a window glass 7G located in the window aperture 7C and is inflatable by means of an inflator 36 located adjacent to a top edge 34 of the airbag 30. The third airbag 30 has an inverted L-shaped front end portion formed by a front end wall 37 and the upper tongue 33 extending forward past the front end wall. Third airbag 30 further has an L-shaped rear end portion formed by a rear end wall 38 and the lower tongue 32 extending rearward past the rear end wall. An outer face of the tongue 33 includes an end lip 35 defining a recess 26C shaped and located to engage, when the airbag 20 is deployed, with the C-post 8C. An outer face of the tongue 32 also has a recess (not visible in FIG. 4) formed in it for cooperation with the D-post 8D. As before, this engagement with the C and D posts 8C and 8D is advantageous in that it prevents sliding of the airbag 30 in a longitudinal direction of the motor vehicle 5.

The tongue 22 on the second airbag 20 is located near to the lower edge of the airbag 20 and the tongue 33 on the third airbag 30 is located near to an upper edge 34 of the third airbag 30 so that the two tongues 22, 33 can nest or interlock with one another.

It will be appreciated that when the second and third airbags 20 and 30 are in their fully deployed states a friction force is generated between the two tongues 22, 33 particularly along a horizontal interface formed between the two tongues 22, 33. This friction force is advantageous in that it resists sliding of one tongue relative to the other thereby holding the two airbags 20, 30 together.

The fourth airbag 40 has an L-shaped front end portion formed by a front end wall 47 and the tongue 43 and a rear end (not shown). An outer face of the tongue 43 includes an end lip 45 defining a recess 26D that is engageable, when the airbag 20 is deployed, with the D-post 8D. As before, the engagement of the tongue 43 with the D-post is advantageous in that it helps to prevent sliding of the airbag 40 in a rearward longitudinal direction of the motor vehicle 5.

The tongue 32 on the third airbag 30 is located near to the lower edge of the airbag 30 and the tongue 43 on the fourth airbag 40 is located near to an upper edge of the fourth airbag 40 so that the two tongues 32, 43 can nest or interlock with one another.

As before, when the third and fourth airbags 30 and 40 are in their fully deployed states, a friction force is generated between the two tongues 32, 43 particularly along a horizontal interface formed between the two tongues 32, 43. This friction force resists sliding of one tongue relative to the other thereby holding the two airbags 30, 40 together.

Although in the embodiment described the second and third airbags 20 and 30 are "Z-shaped" it will be appreciated that the invention is not limited to such shapes or to the orientation of such a shape and that other combinations of shape could be used. For example the first and fourth airbags could be "L-shaped", the second and third airbags could be "T-shaped" and the second and third airbags could be inverted relative to one another so that one is wider at the upper edge than the lower edge and vice versa. However, in all cases the shaping of the adjacent airbags is such that the two airbags can overlap or interlock with one another so as to overlie a common structural member, such as a B- or C-post.

Figure 5:
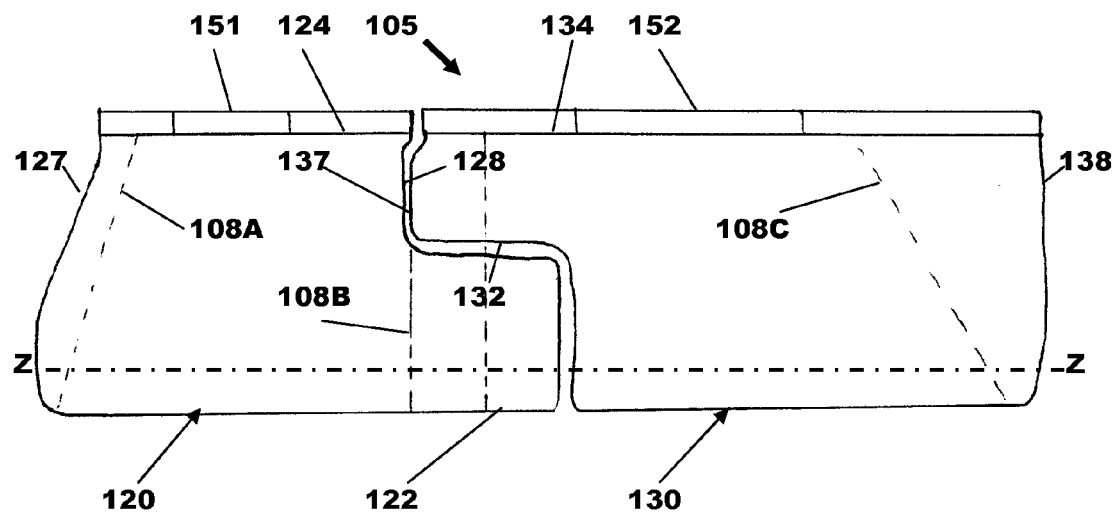
FIG. 5 is a view similar to that shown in FIG. 2 but showing a second embodiment of an airbag assembly.
Figure 6:
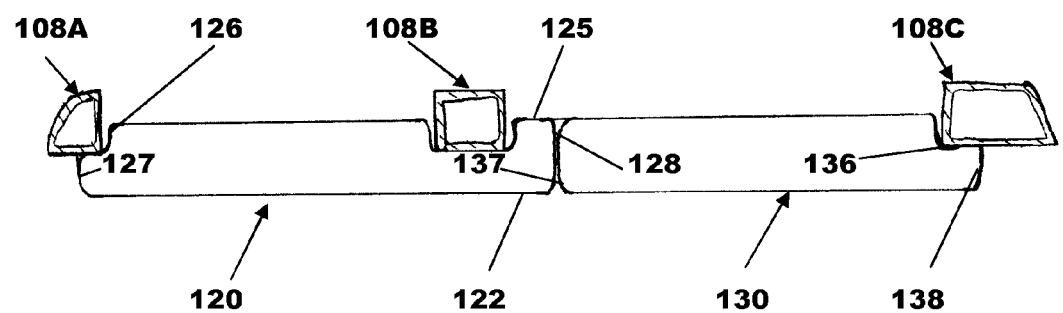
FIG. 6 is a cross-section along the line Z-Z on FIG. 5

Referring now to FIGS. 5 and 6 there is shown a second embodiment of the invention that is particularly applicable to a motor vehicle in the form of a passenger car.

The motor vehicle has A, B and C posts 108A, 108B and 108C (shown only as chain dotted outlines on FIG. 5) and two airbags 120, 130.

A first airbag 120 covers the A and B posts 108A and 108B and a second airbag 130 covers the B and C posts 108B and 108C.

The first airbag 120 has an L-shaped rear end portion formed by a rear end wall 128 and a tongue 122. An outer face of the tongue 122 has a lip 125 and is shaped so as to be engageable, when the airbag 120 is deployed, with the B-post 108B. The first airbag 120 has an inflator 151 located at an upper edge 124 of the airbag 120 for inflating the airbag 120 so as to deploy it.

A front portion of the first airbag 120 is defined by a front edge 127 and has a recess 126 shaped to conform with the A-post 108A.

The second airbag 130 has an L-shaped front end portion formed by a front end wall 137 and a tongue 132. An outer face of the tongue 132 has a lip (not shown) and is shaped so as to be engageable, when the airbag 120 is deployed, with the B-post 108B. The second airbag 130 has an inflator 152 located at an upper edge 134 of the airbag 120 for inflating the airbag 130 so as to deploy it.

A rear portion of the second airbag 130 is defined by a rear edge 138 and has a recess 136 shaped to conform to the C-post 108C.

When the first and second airbags 120 and 130 are in their fully deployed states, a friction force is generated between the two tongues 122, 132 particularly along a horizontal interface formed between the two tongues 122, 132. This friction force is advantageous in that it resists sliding of one tongue relative to the other thereby holding the two airbags 120, 130 together.

The abutting end portions of the first and second airbags 120, 130 are L-shaped and the L-shaped portion on the second airbag 130 is inverted relative to the L-shaped portion on the first airbag 120 so that the tongues 122, 132 can overlap with one another in the vertical direction.

With particular reference to FIG. 5 it can be seen that when the first and second airbags 120 and 130 are fully deployed the tongue 122 of first airbag 120 is located near to a lower edge of the first airbag 120 and extends rearwardly towards the second airbag 130 so as to fully overlie the B-post 108B, and further that the tongue 132 of second airbag 130 extends forwardly towards the first airbag 120 so as to fully overlie the B-post 108B. The two tongues 122, 132 lie contact to one another and overlap one another in the vertical direction. Although a gap is shown in FIG. 5 between the two airbags 120, 130 and between the tongues 122, 132 this is merely for illustrative purposes and in practice the first and second airbags 120 and 130 may contact or abut one another and the two tongues 122, 132 interact with one another.

Although it is desirable to form the outer surface of each of the tongues 122, 132 so that it can conform to the shape of the underlying structural member (such as the B-post 108B) it will be appreciated that the length of the tongues 122, 132 is such that even if they do not engage with the underlying B-post 108B the large distance of overlap of the tongues makes results in a low possibility that movement of the two airbags 120, 130 in opposite horizontal directions will expose the underlying B-post 108B.

It will be appreciated by those skilled in the art that although the invention has been described by way of example with reference to one or more embodiments it is not limited to the disclosed embodiments and that one or more modifications to the disclosed embodiments or alternative embodiments could be constructed without departing from the scope of the invention as set out in the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A curtain airbag assembly for a motor vehicle comprising:
    a forward airbag having a main body portion and a rear end portion extending rearward from the main body portion; and
    a rear airbag having a main body portion and a forward end portion extending forward from the main body portion, the forward end portion vertically overlapping with the rear end portion, the forward and rear end portions each having an end lip defining a recess in an outer face of the respective airbag, the recesses shaped to wrap around an outer surface of a structural member of the vehicle.

2. The assembly as claimed in claim 1 wherein the rear end portion is L-shaped and the forward end portion is inverted L-shaped.

3. The assembly as claimed in claim 1 wherein the rear end portion is located adjacent to a lower edge of the forward airbag and the forward end portion is located adjacent to an upper edge of the rear airbag.

4. The assembly as claimed in claim 1 wherein the end lips of the forward and rear end portions are shaped to engage with a B-post of the vehicle, the forward airbag further has a front edge adapted to overlie an A-post of the vehicle, and the rear airbag further has a rear edge adapted to overlie a C-post of the vehicle.

5. A motor vehicle comprising;
    a post separating a forward window opening and a rear window opening;
    a forward airbag stored in an uninflated condition above the forward window for deployment downward to an inflated condition wherein a main body portion overlies a portion of the forward window and a rear end portion extending rearward from the main body portion, the rear end portion having an end lip defining a recess in an outer face thereof shaped to wrap around an outer surface of the post; and
    a rear airbag stored in an uninflated condition above the rear window for deployment downward to an inflated condition wherein a main body portion overlies a portion of the rear window and a forward end portion extends rearward from the main body portion, the forward end portion having an end lip defining a recess in an outer face thereof shaped to wrap around the outer surface of the post, the forward end portion vertically overlapping with the rear end portion at the post.

6. The motor vehicle of claim 5 further comprising:
    a post separating the rear window opening from third window opening to the rear of the rear window opening; and
    a third airbag stored in an uninflated condition above the third window for deployment downward to an inflated condition wherein a main body portion overlies a portion of the third window and a forward end portion extending forward from the main body portion overlies the second post;

the rear airbag having a rear end portion extends rearward from the main body portion to overlie the second post, the forward end portion of the third airbag vertically overlapping with the rear end portion of the rear airbag at the second post.

7. The assembly as claimed in claim 5 wherein the rear end portion is L-shaped and the forward end portion is inverted L-shaped.

8. The assembly as claimed in claim 5 wherein the rear end portion is located adjacent to a lower edge of the forward airbag and the forward end portion is located adjacent to an upper edge of the rear airbag.

\* \* \* \* \*